United States Patent [19]
Herrera et al.

[11] 3,976,188
[45] Aug. 24, 1976

[54] DISTRIBUTING AND PROCESSING APPARATUS

[75] Inventors: Frank J. Herrera, Downey; Rodger G. Ponce, Los Angeles, both of Calif.

[73] Assignee: Casa Herrera, Inc., Los Angeles, Calif.

[22] Filed: Aug. 13, 1974

[21] Appl. No.: 497,006

[52] U.S. Cl. ........................... 198/31 AA; 198/102; 198/140
[51] Int. Cl.² ....................................... B65G 47/26
[58] Field of Search ............. 198/31 R, 31 AA, 29, 198/30, 102, 140, 145, 148

[56] References Cited
UNITED STATES PATENTS

| | | | |
|---|---|---|---|
| 1,322,839 | 11/1919 | Streich et al. | 198/140 X |
| 1,987,274 | 1/1935 | Sundbom | 198/31 AA |

Primary Examiner—L. J. Paperner
Assistant Examiner—James M. Slattery
Attorney, Agent, or Firm—Benoit Law Corporation

[57] ABSTRACT

Apparatus for distributing a series of objects into two paths comprise a series of containers for successively receiving the objects, equipment for advancing that series of containers in an endless path, equipment for depositing the objects in successive ones of the advancing containers, devices in odd-numbered ones of the series of containers including a first container for causing movement of deposited objects in these odd-numbered containers and toward one of the two paths, and devices in even-numbered ones of the series of containers for causing movement of deposited objects in the even-numbered containers and toward the other of the two paths. These apparatus also include an endless conveyor having first cups for receiving objects from the odd-numbered containers and second cups, staggered relative to the first cups, for receiving objects from even-numbered containers. The first cups are advanced in the mentioned one path in alignment with odd-numbered containers, and the second cups are advanced in the mentioned other path in alignment with even-numbered containers.

9 Claims, 2 Drawing Figures

DISTRIBUTING AND PROCESSING APPARATUS

CROSS-REFERENCE

The subject patent application is related in subject matter to the copending patent application Ser. No. 497,016, filed of even date herewith, now Pat. No. 3,938,319, by Frank J. Herrera, and assigned to the subject assignee.

BACKGROUND OF THE INVENTION

1. Field of the Invention

The subject invention relates to equipment for distributing and processing objects, such as lumps of dough in automated bakery equipment.

2. Description of the Prior Art

Although the subject invention is broadly applicable in many areas involving distribution and processing of objects, it is herein disclosed with primary reference to apparatus for proofing lumps of dough as, for instance, employed in automated bakeries and similar institutions.

Several instances are known in the art of baking or dough processing which require dough to be brought to a proper condition for a subsequent operation. For instance, after dough has been divided into lumps, the lumps are rounded up and the rounded up lumps are allowed to stand a given time to recuperate from the dividing and rounding up action, before they are processed further. Similary, it is frequently necessary to bring lumps of dough to a certain humidity or temperature level which renders them suitable for a desired operation. Frequently, time delays in the handling of dough are necessary to permit dough to rise under the influence of yeast or a similar agent, or in order to enable another desired chemical reaction inside the dough.

These and other processes which require lumps of dough to be subjected to a delayed time action or to a controlled period of inaction are herein consolidated under the designation "proofing", with the latter term being employed in a broad and generic sense without any intention of limitation to a strict and technical meaning.

In terms of human history, the classical method for providing the time element requisite to the proofing of dough has been and for the most part still is letting the dough rest for a while in a stationary condition.

In modern bakery enterprises, this time-honored method has brought about considerable inconvenience, as the lumps of dough in question typically has to be gathered onto pans with the aid of manual labor and, after the proofing step, had to be redistributed into the further manufacturing process.

With the advent of the machine age, various attempts were made to mechanize the proofing process. While some limited success was achieved in this area, the need for reliable and effective automatic proofing equipment has persisted up to the present.

SUMMARY OF THE INVENTION

It is an object of this invention to overcome the above mentioned disadvantages.

It is a related object of this invention to provide improved apparatus for proofing lumps of dough.

It is a further object of this invention to provide improved equipment for transporting lumps of dough inside proofing equipment.

It is a similar object of this invention to provide improved equipment for discharging lumps of dough from proofing apparatus.

It is a further object of this invention to provide improved apparatus for distributing lumps of dough.

It is a related object of this invention to provide improved apparatus for distributing a series of objects in general.

From one aspect thereof, the subject invention resides in apparatus for transporting a series of objects in two paths, comprising in combination a series of containers for successively receiving said objects, means for advancing said series of containers in an endless path, means for depositing the objects in successive ones of the advancing containers, means in odd-numbered ones of the series of containers including a first container for causing movement of deposited objects in the odd-numbered containers and toward one of the two paths, and means in even-numbered ones of the series of containers for causing movement of deposited objects in the even-numbered containers and toward the other of the two paths, endless conveying means including a series of first means for receiving objects from said odd-numbered containers, and a series of second means, staggered relative to said first means, for receiving objects from said even-numbered containers, and means coupled to said advancing means and to said first and second means for advancing said first means in said one path in alignment with odd-numbered containers, and for advancing said second means in said other path in alignment with even-numbered containers.

From another aspect thereof, the subject invention resides in apparatus for proofing lumps of dough, comprising in combination an endless conveyor, a series of first means on the conveyor for transporting lumps of dough, a series of second means on the conveyor for transporting lumps of dough, the second means being spaced from the first means, and the first and second means being staggered relative to each other, means for loading lumps of dough into the first and second means, means for deriving transported lumps of dough from the first and second means, enclosure means for the endless conveyor and the first and second means, and means for providing inside the enclosure means a proofing environment for the lumps of dough.

From yet another aspect thereof, the subject invention resides in apparatus for proofing lumps of dough, comprising in combination an endless conveyor, a series of cups for transporting lumps of dough, means for tiltably mounting the cups on the conveyor, means for loading lumps of dough into the cups, and means for selectively tilting the cups to discharge transported lumps of dough. In accordance with an important feature of this aspect of the invention, the conveyor includes an endless conveyor loop and rotary means for supporting the endless conveyor loop, and the tilting means include a shaft for the rotary means, and means for positioning this shaft in a path of the cups. The apparatus under discussion further includes enclosure means for the endless conveyor and the cups, and means for providing inside the enclosure means a proofing environment for the lumps of dough.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
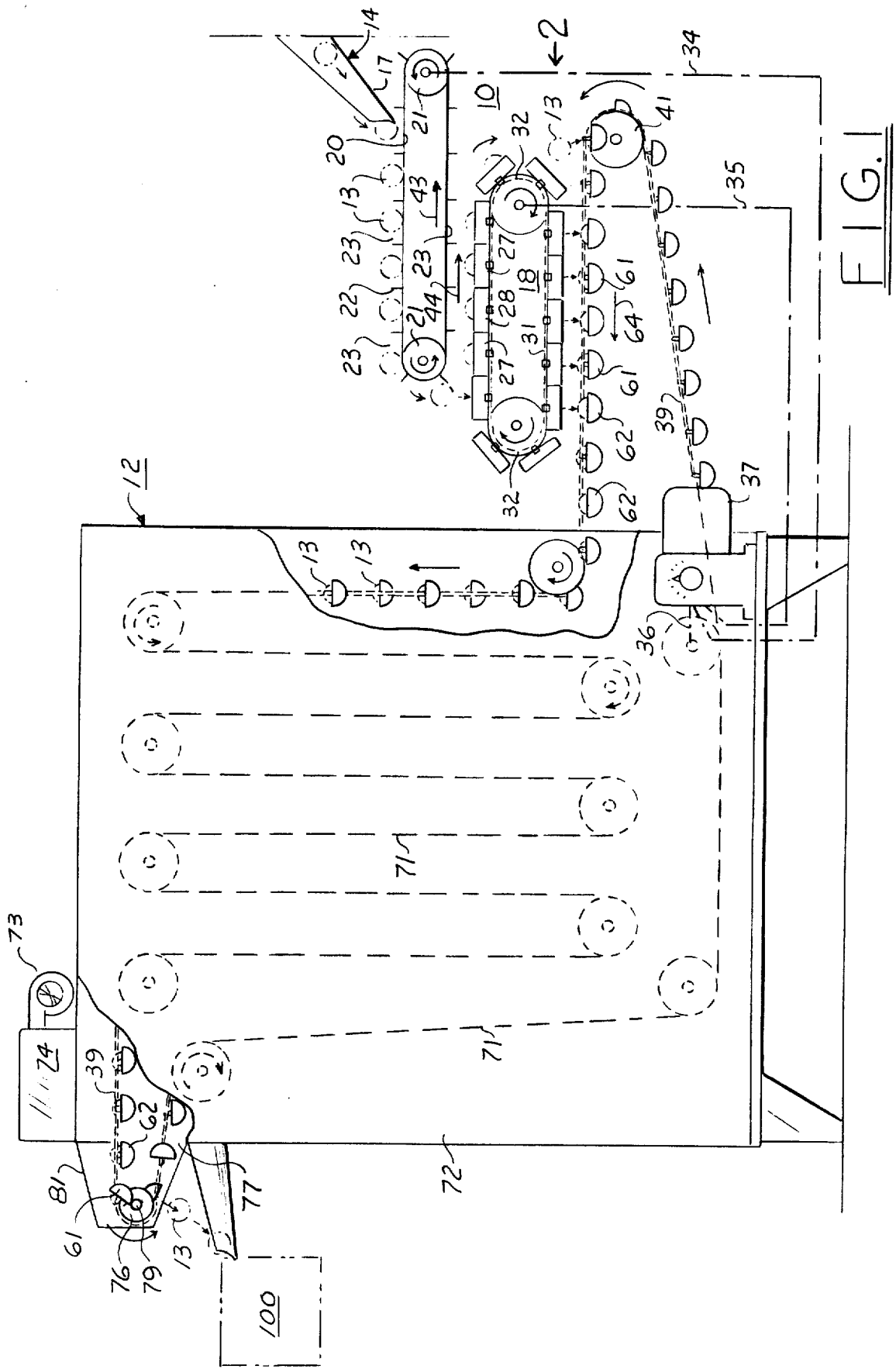
FIG. 1 is a side view of apparatus for distributing and processing a series of objects, such as balls of dough in a proofer, in accordance with a preferred embodiment of the subject invention.
Figure 2:
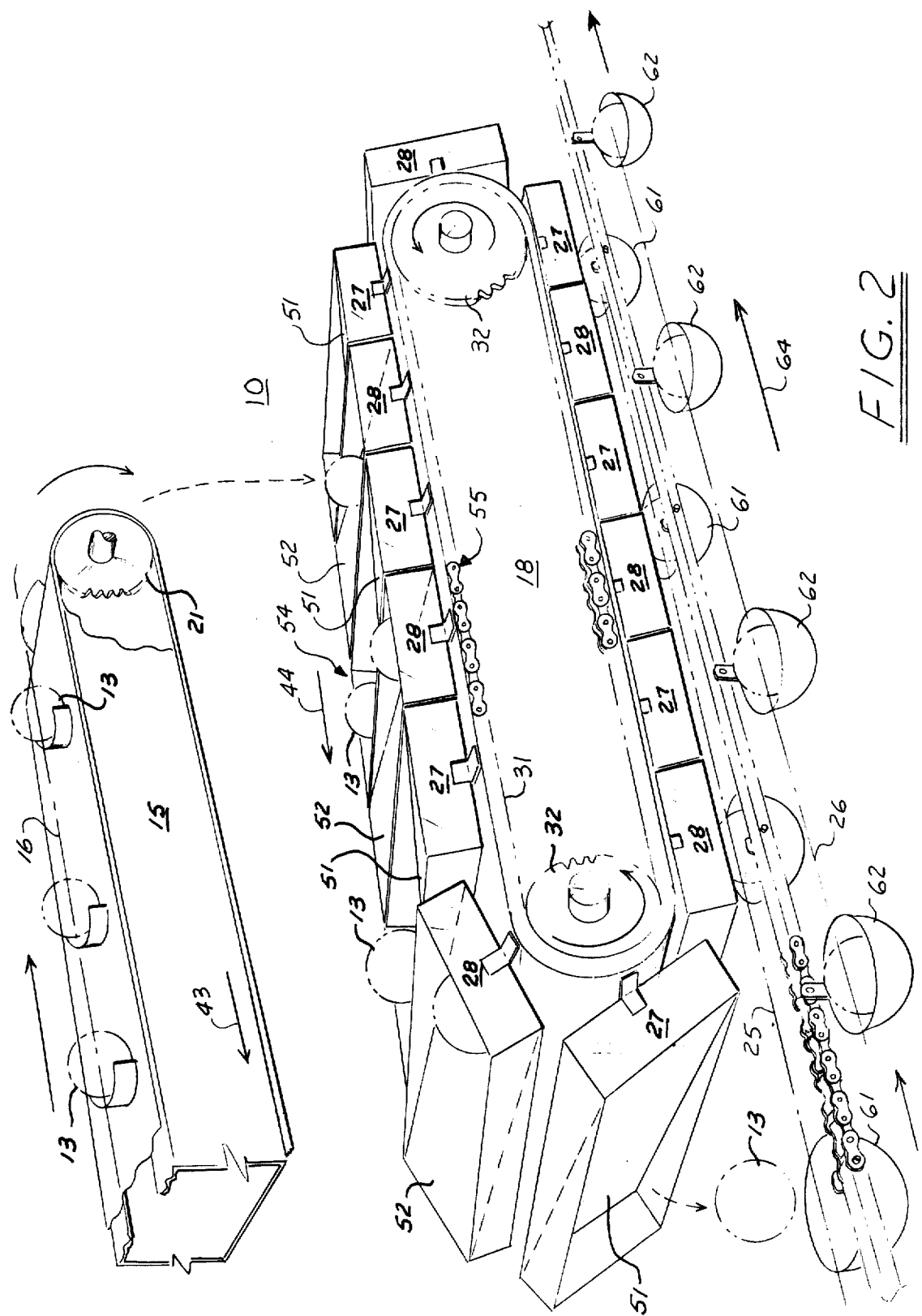
FIG. 2 is an enlarged representation of the right-hand side of FIG. 1, as viewed from behind the apparatus shown in FIG. 1.

The object distributing apparatus 10 shown in FIGS. 1 and 2 is ancillary to apparatus 12 for proofing lumps or balls of dough 13. It is, however, to be understood that the subject invention and its utility are not so limited.

In the illustrated preferred embodiment, the distributing apparatus 10 is provided with balls of dough 13 from a schematically illustrated supply 14. Conventional machines such as "Union Bun Machines" (not shown) exist for forming the balls of dough 13 from a mass of flour dough.

An elongate conveyor 15 transports the dough balls 13 along a single path 16 from an outlet or chute 17 of the dough ball source 14 to the actual distributor 18.

To this end, the conveyor 15 has an endless conveyor loop 20 supported by rotary sprocket wheels 21 and equipped with cleats 22 for dividing the conveyor into a series of distinct compartments 23 for receiving and transporting the balls 13.

The chief objective of the distributing apparatus 18 is to distribute the balls 13 from the single path 16 into two paths 25 and 26. To this end, the distributing apparatus 18 includes a series of containers for successively receiving the balls 13. For the purpose of explanation and definition, the containers of the distributing apparatus 18 may be considered as divided into odd-numbered containers 27 and even-numbered containers 28, as best seen in FIG. 2.

One of the odd-numbered containers may arbitrarily be considered as the first container in the series, in order to establish the odd and even numbered system shown in FIG. 2.

The containers 27 and 28 are advanced in an endless path. To this end, the containers 27 and 28 are individually attached to an endless conveyor loop including one or more endless conveyor chains 31 supported by rotatable sprocket wheels 32.

In accordance with an important aspect of the illustrated preferred embodiment, the conveyor 15, the distributing apparatus 18 and adjacent conveying means of the proofer 12 are driven in mutual synchronism. This is illustrated in FIG. 1 by showing phantom lines 34, 35 and 36 emanating from the same variable speed drive 37 for driving, respectively, the conveyor 15, the distributing apparatus 18 and the conveyor 39 of the proofer 12. In practice, these parts of the apparatus may, indeed, be driven directly from the electric motor 37. On the other hand, synchronism may also be achieved by driving the conveyor 15 and the distributing apparatus 18 from a sprocket wheel 41 of the proofer conveyor 39.

The synchronism under discussion is not only a temporal synchronism, but also a spatial synchronism, in that the compartments 23 of the conveyor 15 are driven in spatial coinidence with corresponding containers 27 and 28.

The same applies to the devices, more fully described below, into which the distributing apparatus 18 discharges the dough balls 13.

Dough balls 13 advanced from the source 14 fall off an end of the elongate conveyor 15, whereby the conveyor 15 deposits the objects in successive ones of the advancing containers 27 and 28. In this manner, all of the balls 13 are fed to the distributing apparatus 18 from essentially the same location in space.

In accordance with an important feature of the illustrated preferred embodiment, the conveyor 15 and the distributing apparatus 18 are driven in such a manner that compartments 23 at the bottom run of the conveyor 15 and containers 27 and 28 at the top run of the distributing apparatus 18 travel in mutual alignment when the compartments 23 are situated adjacent their corresponding containers. This is symbolized by the arrow 43 for the conveyor 15 and the arrow 44 for the containers 27 and 28.

In this manner, placement of transferred dough balls 13 into the appropriate containers 27 and 28 is assured even if balls should temporarily stick to the conveyor 15 as is often the case with certin doughs, particularly doughs employed in the preparation of tortillas, pizza pies and similar bakery goods having a relatively high lard content.

Each bottom 52 of the even-numbered containers 28 includes a surface inside that even-numbered container which is inclined in a second sense different from the first sense mentioned in the preceding paragraph relative to the horizontal plane mentioned therein when the particular even-numbered container 28 is located at the mentioned one side of that horizontal plane. In other words, the surfaces 51 and 52 are complementary relative to a vertical plane through the direction of advancement of the containers 27 and 28 at the same side of the sprocket wheels 32.

Because of the illustrated and defined different inclinations of the container bottom surfaces 51 and 52, dough balls 13 discharged from the conveyor 15 will roll in the odd numbered containers 27 to one side 54 of the distributing apparatus, and the dough balls 13 discharged from the conveyor 15 into the even-numbered containers 28 will roll to the other side 55 of the distributing apparatus 18.

Accordingly, the container bottoms 51 represent means in the odd-nubmered containers 27 for causing movement of deposited balls 13 in the odd-numbered containers 27 and toward the one path 25 of the two paths 25 and 26. The bottoms 52, on the other hand, constitute means in even-numbered containers 28 for causing movement of deposited balls 13 in the even-numbered containers 28 and toward the other path 26 of the two paths 25 and 26.

The objects or balls 13 discharged by the odd-numbered containers 27 are received by cups 61 which are tiltably attached to the endless proofer conveyor 38. On the other hand, the objects or balls 13 discharged by the even-numbered containers 28 are received by cups 62 which are tiltably attached to the endless proofer conveyor 39. As seen in FIG. 2, the cups 61 and the cups 62 are staggered relative to each other. It will thus be recognized that the cups 61 constitute a series of first means on the conveyor 39 for receiving objects from containers of the distributing apparatus 18, while the cups 62 constitute a series of second means on the conveyor 39 for receiving objects from other containers of the distributing apparatus 18. The mutually staggered arrangement of these receiving means or cups 61 and 62 not only promotes the ease of the distributing action by the apparatus 18, but also permits the provision of an increased number of cups on the proofer conveyor 39 as compared to a design in which corresponding cups 61 and 62 would be directly opposite each other on the conveyor 39.

To provide for a proper distribution of the balls 13, the cups 61 and 62 are moved in temporal and spatial synchronism or coincidence with the corresponding odd and even numbered containers 27 and 28. In particular the distributing apparatus 18 and the conveyor 39 are driven in such a manner that odd-numbered containers 27 and corresponding cups 61, as well as even-numbered containers 28 and corresponding cups 62, travel in mutual alignment in the direction of arrow 64 containers 27 and 28 are located next-adjacent to cups 61 and 62, respectively, in their travel from the right-hand side to the left as seen in FIG. 1, or from the left-hand side to the right as seen in FIG. 2. In this manner, misplacements of discharged dough balls on account of their tendency to stick to the containers 27 and 28 are avoided.

As far as the illustrated distributing apparatus 18 is concerned, it will be noted that it is implicit in the function of the differently tilted container bottoms 51 and 52 that the total number of containers 27 and 28 be even, rather than odd so as to make sure that there are no equally tilted container bottoms next-adjacent each other in the endlessly arranged series of containers.

As indicated by dotted lines 71 in FIG. 1, the endless conveyor 39 with its tiltably attached cups 61 and 62 extends in a boustrophedonic manner inside the proofer which is provided with an enclosure 72 for containing a proofing environment for the traveling dough balls 13. To this end, the proofer 12 may be equipped with an air blower 37 discharging air into a humidifier and heater 74 which provides an atmosphere of desired temperature and humidity for the inside of the proofer 12.

Rotary means in the form of a sprocket wheel 76 are located outside the proofer 12 adjacent a discharge opening 77. The proofer conveyor 39 extends over the sprocket wheel 76 when traveling out of and subsequently back into the exit opening 77. The sprocket wheel 76 which supports the conveyor 39 is mounted on a shaft 79 which, in turn, is rotatably mounted by a mounting bracket, part of which is seen at 81 in FIG. 1. The mounting bracket 81 and the sprocket wheel 76 cooperate in positioning the shaft 79 in the path of the cups exiting through the opening 77 of the proofer 12 in such a manner, that the exiting cups 61 and 62 successively impinge upon the shaft 79 and are tilted thereby when the conveyor 39 travels about the sprocket wheel 76. In this manner, the cups 61 are tilted by the portion of the shaft 79 visible in FIG. 1, while the cups 62 are tilted by the portion of the shaft 79 hidden from view in FIG. 1 by the sprocket wheel 76.

This manner of tilting of the cups 61 and 62 makes for a very effective and satisfactory discharge of the proofed dough balls 13 even where problems of dough stickiness are encountered.

The proofed and discharged dough balls 13 are subjected to further processing in equipment symbolized by the block 100. By way of example, the block 100 in practice may include a flour head or other equipment (not shown) for rolling the proofed dough balls into round sheets of dough for the preparation of tortillas, pizzas, pies or other bakery products.

It should be understood at this juncture, that the distributing system herein disclosed may also be employed with proofing equipment of the type disclosed in the application or patent listed in the cross-reference at the head of this application or patent. In general, many other applications of the disclossed object-distributing system will be apparent to those skilled in the art.

The subject extensive disclosure will render apparent or suggest various modificatins and variations within the spirit and scope of the invention to those skilled in the art.

We claim:
1. Apparatus for transporting a series of objects in two paths, comprising in combination:
   a series of containers for successively receiving said objects;
   means for advancing said series of containers in an endless path;
   means for depositing said objects in successive ones of said advancing containers;
   means in odd-numbered ones of said series of containers including a first container for causing movement of deposited objects in said odd-numered containers and toward one of said two paths;
   means in even-numbered ones of said series of containers for causing movement of deposited objects in said even-numbered containers and toward the other of said two paths;
   endless conveying means including a series of first means for receiving objects from said odd-numbered containers, and a series of second means, staggered relative to said first means, for receiving objects from said even-numbered containers; and
   means coupled to said advancing means and to said first and second means for advancing said first means in said one path in alignment with odd-numbered containers, and for advancing said second means in said other path in alignment with even-numbered containers.
2. Apparatus as claimed in claim 1, wherein:
   said depositing means include means for feeding all of said objects from essentially the same location in space to said advancing containers.
3. Apparatus as claimed in claim 1, wherein:
   said depositing means include means for feeding all of said objects along a single path to said advancing containers.
4. Apparatus as claimed in claim 1, wherein:
   said depositing means include a conveyor for transporting said objects to said container means.
5. Apparatus as claimed in claim 4, wherein:
   said conveyor has an end portion for discharging said transported objects into said containers.
6. Apparatus as claimed in claim 4, wherein:
   said conveyor includes compartments for receiving objects; and
   said advancing means include means for arranging and advancing object-receiving compartments of said conveyor and containers of said series of containers in mutual alignment.
7. Apparatus as claimed in claim 1, wherein:
   said means in said odd-numbered containers include a surface inside each odd-numbered container being inclined in a first sense relative to a horizontal plane when the particular odd-numbered con- tainer is located at one side of said horizontal plane; and said means in said even-numbered containers include a surface inside each even-numbered container being inclined in a second sense different from said first sense relative to said horizontal plane when the particular even-numbered container is located at said one side of said horizontal plane.

8. Apparatus as claimed in claim 6, wherein:
said first object receiving means and said second object receiving means comprise cups.

9. Apparatus as claimed in claim 8, including:
means for tilting said cups for discharging transported objects.

* * * * *